United States Patent
Thomes et al.

(10) Patent No.: US 9,424,259 B2
(45) Date of Patent: Aug. 23, 2016

(54) METHOD AND SYSTEM FOR MANAGING CONTENT WITHIN A RICH MULTIMEDIA INTERACTION

(75) Inventors: Christopher Thomes, Encino, CA (US); Andrew Rapo, Studio City, CA (US); Allan Jones, Valencia, CA (US); Steven Parkis, Valencia, CA (US); Paul Yanover, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 2064 days.

(21) Appl. No.: 12/009,956

(22) Filed: Jan. 22, 2008

(65) Prior Publication Data

US 2009/0187838 A1    Jul. 23, 2009

(51) Int. Cl.
| | |
|---|---|
| G06F 3/0481 | (2013.01) |
| G06F 3/0484 | (2013.01) |
| G06F 17/30 | (2006.01) |
| H04L 29/08 | (2006.01) |
| G06Q 30/02 | (2012.01) |

(52) U.S. Cl.
CPC ...... G06F 17/30058 (2013.01); G06F 3/04842 (2013.01); G06F 3/0481 (2013.01); G06F 3/0484 (2013.01); G06F 3/04847 (2013.01); G06Q 30/02 (2013.01); H04L 67/02 (2013.01)

(58) Field of Classification Search
CPC . G06F 3/0482; G06F 3/04842; G06F 3/0481; G06F 3/04847; G06F 3/0484; G06F 17/30058; G06Q 30/02; H04L 67/02
USPC .................................. 715/716, 751, 753, 810
See application file for complete search history.

(56) References Cited

U.S. PATENT DOCUMENTS

| 7,631,260 | B1 * | 12/2009 | Riggs et al. .................... 715/716 |
| 2002/0143690 | A1 * | 10/2002 | Mahajan ............ G06Q 30/0601 705/37 |
| 2004/0139106 | A1 * | 7/2004 | Bachman et al. .......... 707/104.1 |
| 2004/0140995 | A1 * | 7/2004 | Goldthwaite et al. ........ 345/716 |
| 2004/0189707 | A1 * | 9/2004 | Moore et al. .................. 345/777 |
| 2004/0233238 | A1 * | 11/2004 | Lahdesmaki ................. 345/810 |
| 2005/0010955 | A1 * | 1/2005 | Elia et al. ........................ 725/88 |
| 2005/0026700 | A1 * | 2/2005 | Blanco ............................ 463/43 |
| 2005/0240880 | A1 * | 10/2005 | Banks et al. ................... 715/836 |
| 2005/0283742 | A1 * | 12/2005 | Gusmorino et al. .......... 715/839 |
| 2006/0085245 | A1 * | 4/2006 | Takatsuka et al. ................ 705/9 |
| 2006/0136246 | A1 * | 6/2006 | Tu ..................................... 705/1 |
| 2007/0139443 | A1 * | 6/2007 | Marks et al. .................. 345/629 |
| 2009/0259971 | A1 * | 10/2009 | Rankine et al. ............... 715/810 |

* cited by examiner

Primary Examiner — Tuyetlien T Tran
(74) Attorney, Agent, or Firm — Farjami & Farjami LLP

(57) ABSTRACT

There is provided a method of managing content within a rich multimedia interaction comprising identifying a set of content objects associated with the rich multimedia interaction, determining a display subset and a reserve subset from the set of content objects, displaying the display subset, activating the reserve content objects in a minimized state, and providing a content control virtual tool configured to group and present a count of the reserve content objects according to their content object classes. The content control virtual tool is further configured to enable a user of the rich multimedia interaction to reassign content objects between the display subset and the reserve subset. A system for managing content within a rich multimedia interaction comprises a content server, a content object database, and a content management software application stored on a data storage unit.

16 Claims, 6 Drawing Sheets

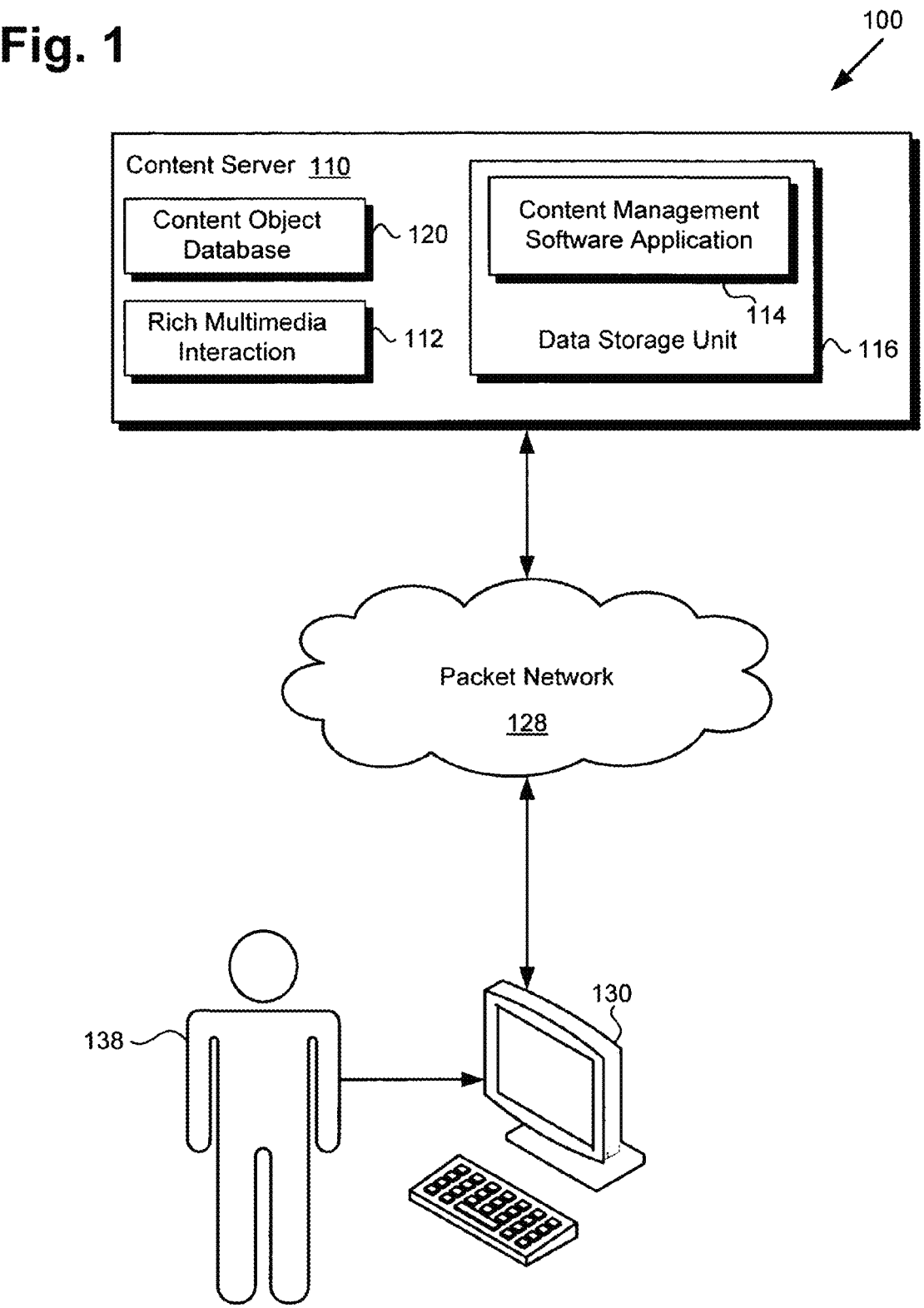

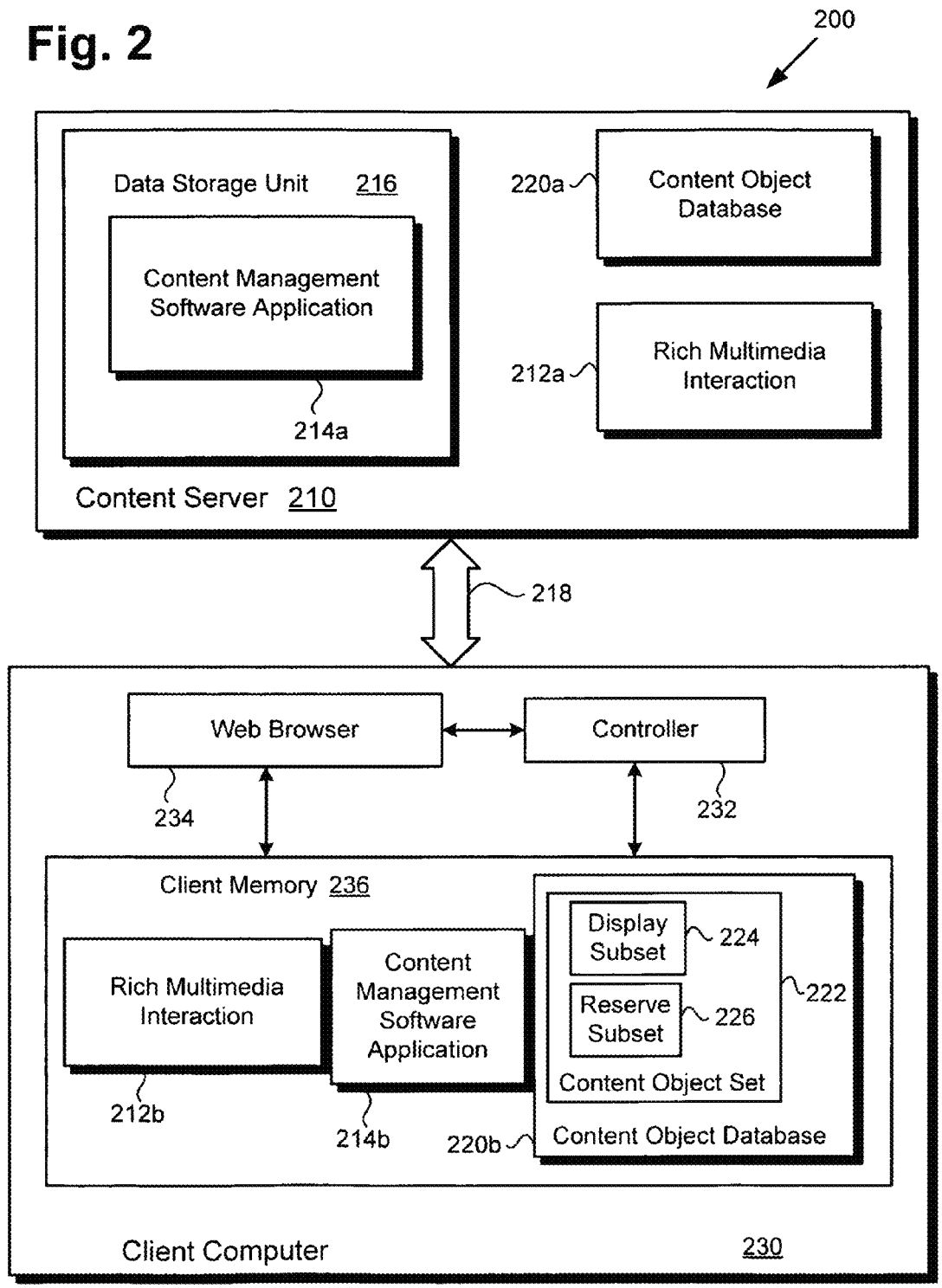

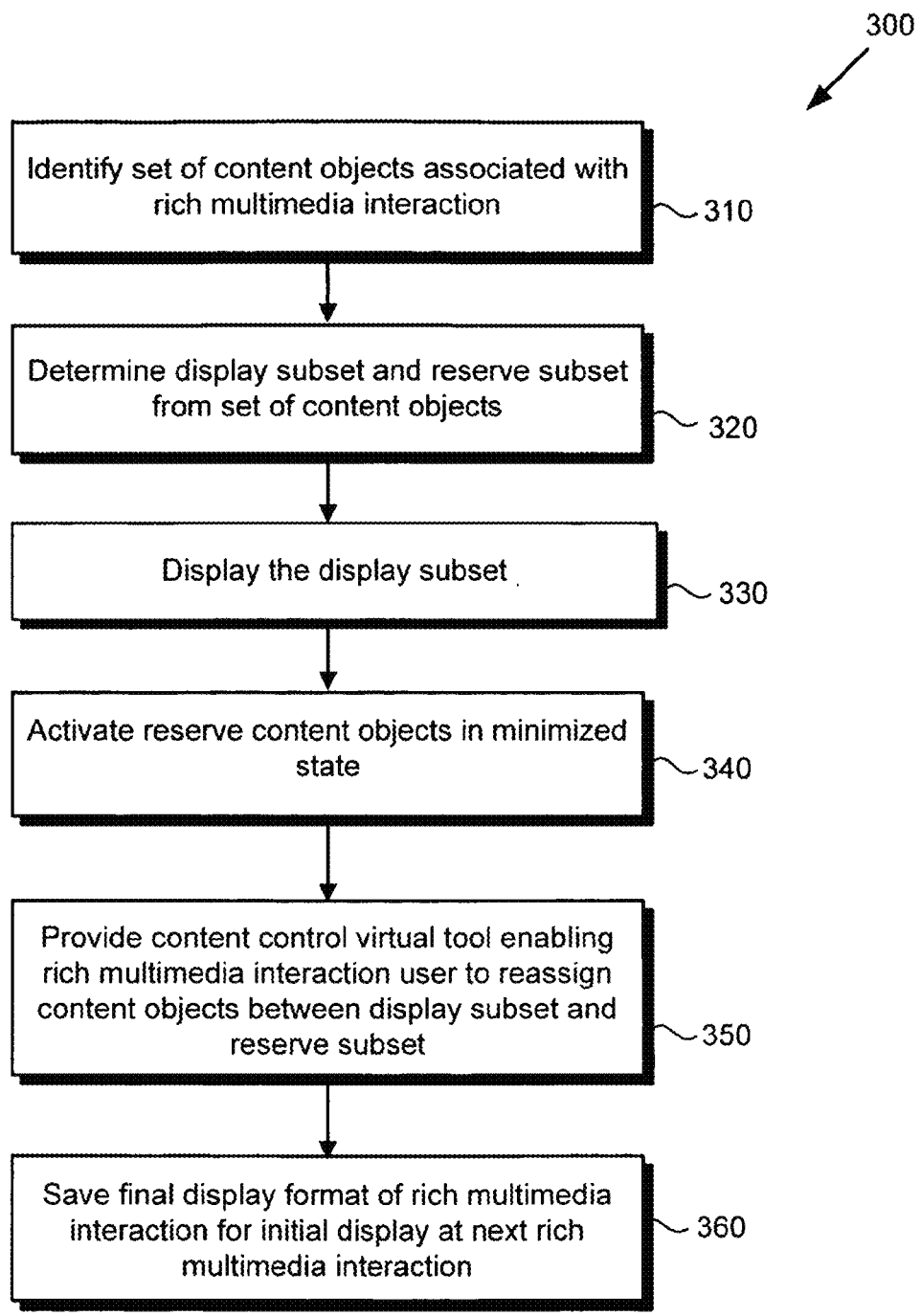

METHOD AND SYSTEM FOR MANAGING CONTENT WITHIN A RICH MULTIMEDIA INTERACTION

BACKGROUND OF THE INVENTION

1. Field of the Invention

The present invention relates generally to the production of entertainment content. More particularly, the present invention relates to the production of computer mediated interactive entertainment content.

2. Background Art

Improvements in the data processing capabilities of widely available personal computing devices, as well as to the communications infrastructure supporting wireless and wired data transmission, have now made it possible to provide computer-based content of astonishing richness. At the same time, the demographic of computer users has broadened and diversified to include a youthful population comfortable with technology, who increasingly turn to personal computing devices as a preferred source of information, entertainment, and even social networking. This demanding group of young computer users insists upon access to frequently updated content, and have progressively higher expectations for the sophistication of the computer mediated content available to them.

In an effort to make use of advances in data processing and data transfer technologies to meet these increasingly elevated user expectations, content providers have progressively moved away from use of the traditional Hypertext Markup Language (HTML) data format when producing computer based content. As a result, more and more computer content has been developed using data formats better enabling of the interactive, rich multimedia experience preferred by users, such as Extensible Markup Language (XML), for example. Use of these versatile data formats, together with embedded graphics applications such as Flash, for instance, have aided content providers in delivering the enhanced graphical information content demanded by users.

Despite their success in producing rich multimedia interactive content, however, the very richness and complexity of that content coupled with the volume of data typically provided in a typical Internet mediated download, presents content providers with a dilemma when attempting to deliver content to users in an enjoyable way. To illustrate the problem, consider the exemplary situation of a content provider delivering a rich multimedia interaction comprising content objects including video clips, audio presentations, and games to a user having accessed an Internet based entertainment website.

In one conventional approach to providing requested content, the various content objects, which may include a particular interactive gaming application, or a display application supporting a particular video presentation, for example, may be presented as links on the entertainment site homepage. An advantage to this approach may be that computing resources and display space on a personal computer screen are reserved for those particular content objects affirmatively selected by the user. A significant disadvantage of this approach, however, is that a user must typically endure a delay after making a selection, during which interval the application supporting that particular content object downloads, and/or launches, and displays. As the information content contained by any particular content object becomes richer and more complex, the delay associated with those operations may prove to be a source of considerable frustration for a user, particularly one seeking a relaxing or pleasurably diverting experience.

As an alternative, content providers might opt to cause all content objects contained within a selected rich multimedia interaction to concurrently download, launch, and display. This approach avoids or minimizes the post user selection delay plaguing the previous strategy. However, this approach exacts its own unpleasant toll in the form of content overload, wherein the proliferation of concurrently displayed content objects compete for the limited viewing space and the limited graphical computing resources available on a computer or mobile communication device screen. As a result, this approach may require a user to identify and close a number of unwanted active content objects in order to enjoy a particular desired content.

As may be apparent from the preceding discussion, both of the described conventional approaches to providing the variety of rich multimedia content demanded by computer users include drawbacks that may lead to user dissatisfaction, and in the process undermine the efforts of content providers to deliver computer based content in an enjoyable manner. Accordingly, there is a need to overcome the drawbacks and deficiencies in the art by providing a user friendly content management solution achieving efficient use of computing and display resources while enabling prompt access to desired content.

SUMMARY OF THE INVENTION

There are provided methods and systems for managing content within a rich multimedia interaction, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 1 shows a diagram of an exemplary system for managing content within a rich multimedia interaction, according to one embodiment of the present invention;

FIG. 2 shows a more detailed exemplary embodiment of a system for managing content within a rich multimedia interaction, according to one embodiment of the present invention;

FIG. 3 is a flowchart presenting a method of managing content within a rich multimedia interaction, according to one embodiment of the present invention;

DETAILED DESCRIPTION OF THE INVENTION

Figure 4A:
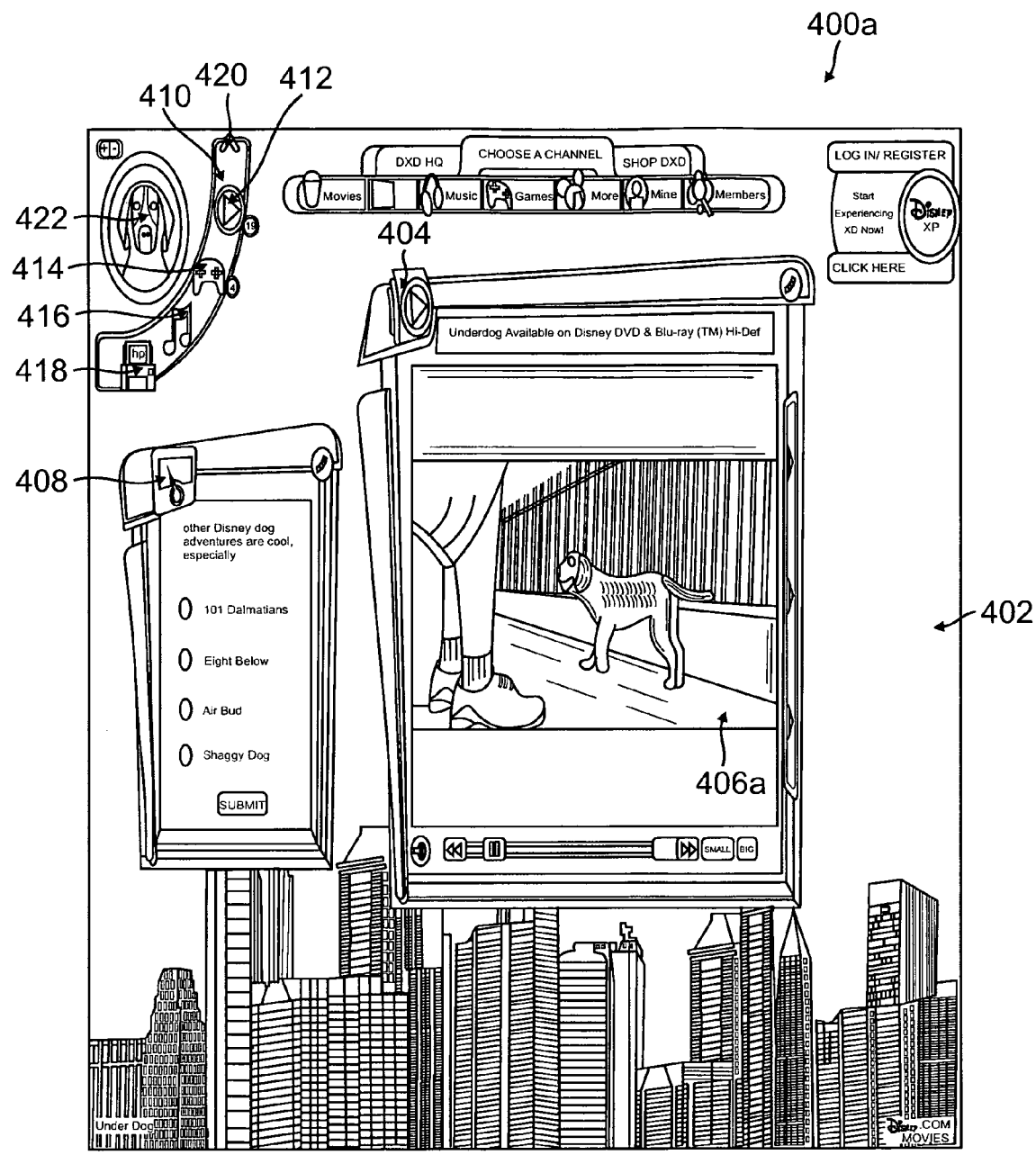
FIG. 4A shows a visual frame of an exemplary rich multimedia interaction in the form of an interactive entertainment channel devoted to the movie Underdog, wherein content is managed according to one embodiment of the present invention.

The present application is directed to a method and system for managing content within a rich multimedia interaction. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

FIG. 1 shows a diagram of an exemplary system for managing content within a rich multimedia interaction, according to one embodiment of the present invention. In the embodiment of FIG. 1, system 100 comprises content server 110 hosting rich multimedia interaction 112. Rich media interaction 112 may comprise, for instance, an interactive entertainment channel devoted to music, television, movies, online chat, or games. As shown in FIG. 1, system 100 further comprises content object database 120 stored on content server 110, and data storage unit 116 storing content management software application 114. Rich multimedia interaction 112, content management software application 114, and content object database 120 may be stored as data files on content server 110, for example. Also shown in FIG. 1 are packet network 128, client computer 130, and user 138.

It is noted that while in the present embodiment, content management software application 114 is shown as data stored separately from rich multimedia interaction 112, in other embodiments content management software application 114 may be embedded in rich multimedia interaction 112. It is further noted that although client computer 130 is represented as a personal computer (PC) in FIG. 1, in one embodiment client computer 130 may be a mobile communication device such as a mobile telephone, a digital media player, personal digital assistant (PDA), a wireless computer, or a wireless gaming console, for example.

In the embodiment of FIG. 1, user 138, who may be a consumer of rich multimedia interaction content, may utilize client computer 130 to access rich multimedia interaction 112, content object database 120, and content management software application 114. Content object database 120, stored on content server 110, is itself configured to store a set of content objects associated with rich multimedia interaction 112. Content objects stored in content object database 120 may include particular items of video or audio entertainment, a particular computer game, an interactive poll, or online chat, for example. User 138 may utilize content management software application 114 to manage the set of content objects drawn from content object database 120, within rich multimedia interaction 112. As can be seen from the present embodiment, content management software application 114, which may be an Extensible Markup Language (XML) based application, for example, may be accessed through packet network 128. In that instance, content management software application 114 may comprise a web application, accessible over a packet network such as the Internet, for example.

Alternatively, content management software application 114 may reside on a server supporting a local area network (LAN), for instance, or included in another type of limited distribution network. In another embodiment, data storage unit 116 containing content management software application 114 may comprise a portable computer readable storage medium such as a compact disc read-only memory (CD-ROM). Analogously, in another embodiment, rich multimedia interaction 112 and content object database 120 may reside on a server supporting a LAN or other limited distribution network.

Turning now to FIG. 2, FIG. 2 provides a more detailed embodiment showing exemplary system 200 for managing content within a rich multimedia interaction. System 200 in FIG. 2 includes client computer 230 receiving a download via communication link 218 from content server 210 including data storage unit 216, rich multimedia interaction 212a and content object database 220a. Client computer 230 corresponds to client computer 130, in FIG. 1. As shown in FIG. 2, client computer 230 comprises controller 232, web browser 234, and client memory 236.

Content server 210, data storage unit 216, rich multimedia interaction 212a, and content object database 220a correspond respectively to content server 110, data storage unit 116, rich multimedia interaction 112, and content object database 120, in FIG. 1. As shown in FIG. 2, data storage unit 216 includes content management software application 214a, corresponding to content management software application 114 in FIG. 1. Also shown in FIG. 2 are rich multimedia interaction 212b, content management software application 214b, and content object database 220b containing content object set 222. Content object set 222 is shown to include display subset 224 and reserve subset 226.

In the present embodiment, rich multimedia interaction 212b, content management software application 214b, and content object database 220b are located in client memory 236, having been received from content server 210 via communication link 218. In the embodiment of FIG. 2, communication link 218 represents download of rich multimedia interaction 212b, content management software application 214b, and content object database 220b over a packet network, for example. In another embodiment, communication link 218 may represent transfer of rich multimedia interaction 212b, content management software application 214b, and content object database 220b, either together or separately, from a CD-ROM or other portable computer readable storage medium. Once transferred, rich multimedia interaction 212b, content management software application 214b, and content object database 220b may be stored in client memory 236 and run locally on client computer 230.

Controller 232 may be the central processing unit for client computer 230, for example, in which role controller 232 runs the client computer operating system, launches web browser 234, and facilitates execution of rich multimedia interaction 212b and content management software application 214b. Web browser 234, under the control of controller 232, may execute content management software application 214b to enable a user of client computer 230 to manage content within rich multimedia interaction 212b.

Implementation of the system embodied in FIG. 2 enables use of client computer 230 to identify a set of content objects associated with rich multimedia interaction 212b, from content object database 220b. Computer 230 may further be used to determine display subset 224 and reserve subset 226, from content object set 222. Management of content within rich multimedia interaction 222b may include displaying display subset 224 and activating the reserve content objects comprising reserve subset 226 in a minimized state. Content management software application 214b may then be utilized to provide a content control virtual tool (not shown in FIG. 2) configured to present a count of the reserve content objects grouped according to one or more content object classes, particular classes corresponding to different types of content, such as video content, audio content, gaming content, and online chat, for example. The content control virtual tool may be further configured to enable a user of computer 230 to reassign content objects between display subset 224 and the reserve subset 226, thereby managing content within rich multimedia interaction 212b.

The present invention will now be further described by FIG. 3, which presents an exemplary method of managing content within a rich multimedia interaction. Certain details and features have been left out of flowchart 300 that are apparent to a person of ordinary skill in the art. For example, a step may consist of one or more substeps or may involve specialized equipment or materials, as known in the art. While steps 310 through 360, in FIG. 3, are sufficient to describe a particular embodiment of the present method, other embodiments may utilize steps different from those shown in flowchart 300, or may include more, or fewer steps.

Continuing with flowchart 300 in FIG. 3, and referring to FIG. 2, step 310 of flowchart 300 comprises identifying a set of content objects associated with the rich multimedia interaction. A particular rich multimedia interaction may correspond to any one of various interactive entertainment channels devoted to specific entertainment content, such as music, television, movies, online chat, and games, for example. As a more specific example, in one embodiment a rich multimedia interaction may take the form of an interactive entertainment channel devoted to the Disney movie Underdog. According to that embodiment, identifying a set of content objects associated with the rich multimedia interaction in step 310 may correspond to recognizing those content objects stored within content object database 220b tagged with one or more elements of the Underdog display motif.

The exemplary method of flowchart 300 continues with step 320, which comprises determining a display subset of content objects and one or more reserve content objects assigned to a reserve subset, from the set of content objects identified in step 310. The decision criteria upon which content objects are assigned to display subset 224 or reserve subset 226 may be based on numerous and variable factors, perhaps depending on the nature of the rich multimedia interaction being engaged by a user. As previously described, content objects may comprise, for example, items of video or audio entertainment, user polls, games, and online chat. Returning to the example of a rich multimedia interaction in the form of an entertainment channel devoted to the Disney movie Underdog, the content objects selected for determination of display subset 224 may be that subset of content objects which most closely correspond to the movie theme, such as a video clip from the movie, or an audio segment from the movie soundtrack. Other, perhaps more derivative items of content, such as an Underdog game, for example, may be determined to belong in reserve subset 226. Determination of display subset 224 and reserve subset 226 in step 320 is followed by step 330, in which display subset 224 is displayed to a user.

Flowchart 300 continues with step 340, comprising activating the reserve content objects determined to belong in reserve subset 226, in a minimized state. Activation of the constituents of reserve subset 226 in a minimized state confers the dual advantages of enabling a user to readily access those reserve content objects without substantial delay, while concurrently conserving display space and graphical computing resources for those content objects meeting the decision criteria for pertinence to the rich multimedia interaction being engaged.

Step 350 of flowchart 300 comprises providing a content control virtual tool enabling the user to reassign content objects between display subset 224 and reserve subset 226. In one embodiment, the content control virtual tool is configured to group and present a count of the reserve content objects according to their content object class further facilitating management of the content within rich multimedia interaction 212b. For example, a content control virtual tool might be displayed in the form of a wheel, or a segment of a wheel, of icons corresponding to various classes of content objects. Those various classes may include messaging content, user polls or questionnaires, and content that facilitates online chat, in addition to separate classes for the video, audio, and gaming content previously described. In one embodiment, the content control virtual tool may be adorned to correspond to the display motif of the rich multimedia interaction in which it appears. In another embodiment, the content control virtual tool may identify a sponsor of the rich multimedia interaction, and/or provide a link to information about the sponsor. For example, in the case of the Disney movie Underdog, the content control virtual tool may include a rollover displaying a picture of Underdog and providing a user with an opportunity to link to the official movie website.

In one embodiment, not reflected in the steps of flowchart 300, the present method further comprises running an executable program by the content control virtual tool. For example, in addition to icons corresponding to the various classes of content objects, the content control virtual tool may have one or more additional icons allowing a user to directly initiate an executable program. Such a program might enable a print operation by a peripheral device linked to a client computer utilized by the user, for instance.

Moving now to step 360 of flowchart 300, step 360 comprises saving a final display format of the rich multimedia interaction for initial display at a next rich multimedia interaction by the user. As described previously in relation to step 350, a user engaging rich multimedia interaction 212b can use the content control virtual tool provided by content management software application 214b to reassign content objects between display subset 224 and reserve subset 226. According to the present embodiment, a final display format reflective of a final display subset and a final reserve subset determined by reassignment of content objects by the content control virtual tool is saved, and serves to determine the initial display subset and initial reserve subset when the user next engages rich multimedia interaction 212b. In one embodiment, a user may identify him/herself through a user identity at login/registration to rich multimedia interaction 212b. In that embodiment, saving of a final display format may be restricted to reassignments performed by a registered user having a valid user identity. Moreover, in that embodiment, changes to the display format made by a registered user may be used to personalize his/her rich multimedia interaction experience, so that different registered users might encounter different initial display formats resulting from respective different final display formats saved at the close of their previous rich multimedia interactions.

Turning now to FIG. 4A, FIG. 4A shows visual frame 400a of an exemplary rich multimedia interaction in the form of an interactive entertainment channel devoted to the Disney movie Underdog, wherein content is managed according to one embodiment of the present invention. As can be seen from FIG. 4A, visual frame 400a has background 402 and a display motif to complement the subject matter of the rich multimedia interaction theme. Visual frame 400a includes video player 404 playing Underdog video clip 406a, user poll 408, and content control wheel 410 of icons including video icon 412, game icon 414, music icon 416, print icon 418, and control wheel rotation activator 420. Also included in visual frame 400a is rollover 422.

Continuing with FIG. 4A and referring to FIG. 2, display subset 224 corresponds in FIG. 4A to displayed content objects comprising Underdog video clip 406a playing on video player 404, and user poll 408. Management of content within visual frame 400a may be achieved through use of a content control virtual tool, shown in FIG. 4A by rollover 422 and content control wheel 410 of icons corresponding to the classes of content objects incorporated into the rich multimedia interaction. In the embodiment of FIG. 4A, control wheel rotation activator 420 indicates that additional icons corresponding to additional content object classes may be revealed by rotating control wheel 410, presented as a wheel segment, upwards. It is noted that in the embodiment of FIG. 4A, the content control virtual tool comprising content control wheel 410 and rollover 422 is adorned to correspond to the display motif of the rich multimedia interaction. That is, content control wheel 410 has assumed a skin consistent with the Underdog display motif, while rollover 422 depicts a likeness of Underdog.

Reserve subset 226 corresponds to reserve content objects that have been activated in a minimized state, are grouped and counted according to their content object class, and may be accessed by content control wheel 410. For example, video icon 412 in FIG. 4A displays a count of nineteen, indicating that the reserve subset includes nineteen video content objects associated with the movie Underdog. Similarly, game icon 414 indicates that there are four gaming content objects in the present reserve subset of this instantiation of the Underdog movie channel. By contrast, the absence of a count displayed by music icon 416 indicates that there are no reserve content objects associated with the movie Underdog belonging to the class of music content objects. It is noted that the absence of content objects classified as music content does not imply the complete absence of music content. For example, content objects classified as video content or gaming content may include musical components.

Content control wheel 410 is also shown to include print icon 418. Unlike video icon 412, game icon 414, and music icon 416 which serve to group and count content objects by content object class, print icon 418 is configured to run an executable program. Selection of print icon 418 by a user enables a local print operation in the present embodiment, allowing a user to print items from the display screen to a peripheral printer. In one embodiment, content control wheel 410 may support no such executable program. In other embodiments, however, several such programs may be supported.

As shown by FIG. 4A, the content control virtual tool provided by content management software application 214b, in FIG. 2, includes rollover 422, which identifies Underdog as the sponsor of the rich multimedia interaction corresponding to the Underdog movie channel. In one embodiment, selection of rollover 422, which may bear the name, logo, or likeness of a sponsor, links a user to information about the sponsor, for example, by enabling the user to access a website hosted by or for the sponsor. In other embodiments a sponsorship may be associated with another movie, such as Pirates of the Caribbean, for example, a commercial organization, or another user hosting a personalized rich multimedia interaction.

Figure 4B:
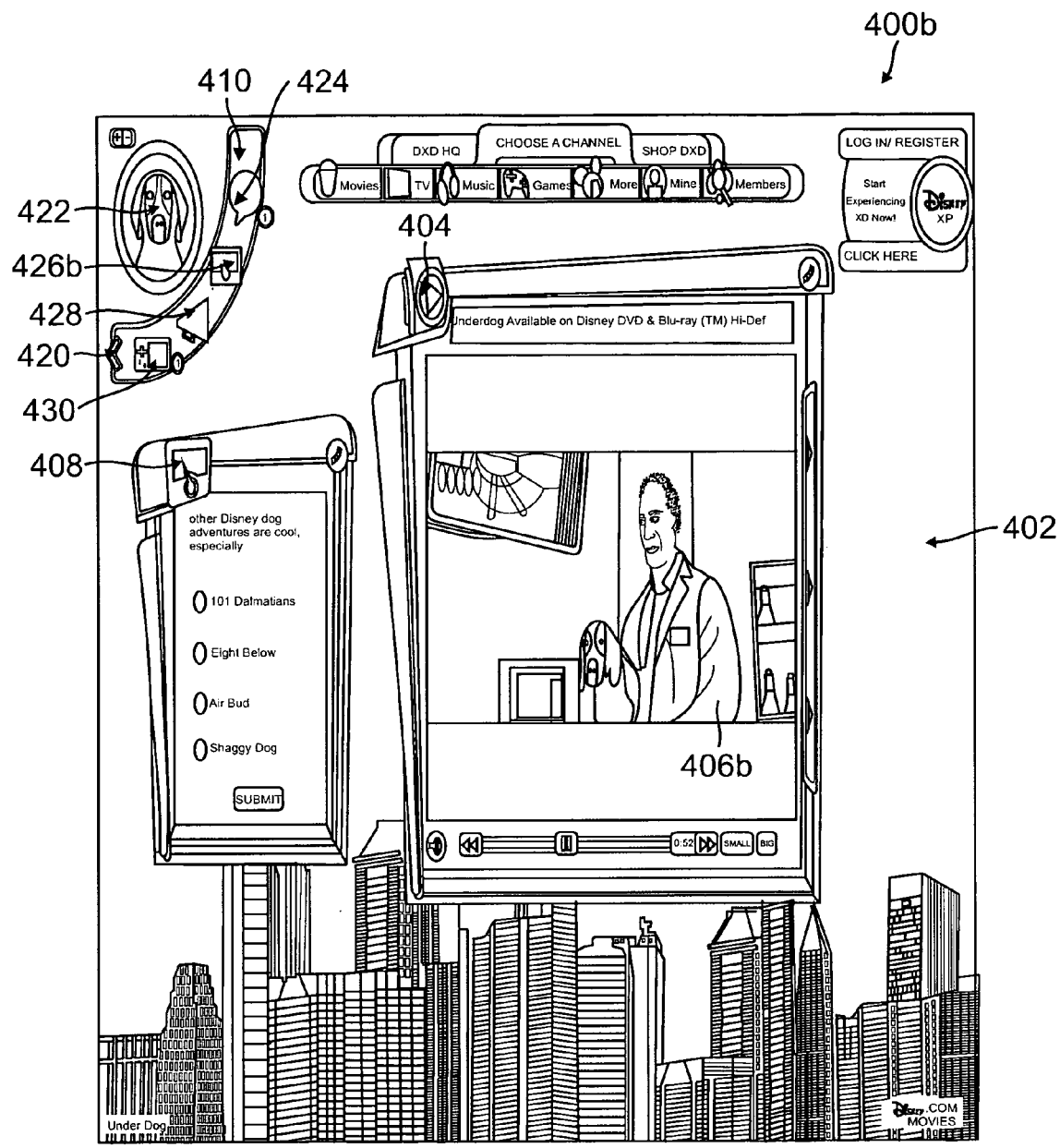
FIG. 4B shows another visual frame of the exemplary rich multimedia interaction of FIG. 4A, wherein content is managed according to one embodiment of the present invention.

As another example of rich multimedia interactive content managed according to an embodiment of the present invention, FIG. 4B shows visual frame 400b of an interactive entertainment channel devoted to the movie Underdog. As was true of visual frame 400a in FIG. 4A, visual frame 400b has background 402 and adopts the Underdog display motif. Like previous visual frame 400a, visual frame 400b includes video player 404, this time playing Underdog video clip 406b, user poll 408, and content control wheel 410 including control wheel rotation activator 420. Instead of video icon 412, game icon 414, music icon 416, and print icon 418 displayed in FIG. 4A, however, the present display state of content control wheel 410 shows chat icon 424, user poll icon 426, message icon 428, and gadget icon 430. Also included in visual frame 400b is rollover 422.

As in FIG. 4A, display subset 224 for visual frame 400b includes Underdog video clip 406b playing on video player 404, and user poll 408. Inspection of content control wheel 410 reveals that user poll icon 426 indicates that there are no user poll content objects in reserve subset 226. Thus, the presence of user poll 408 in visual frame 400b suggests that one user poll content object is contained by the set of content objects associated with the Underdog movie channel, and that single user poll is presently assigned to display subset 224. According to the present embodiment, however, a user may reassign content objects between display subset 224 and reserve subset 226. A user of visual frame 400b may accomplish this by, for example, minimizing user poll 408, causing it to be reassigned to reserve subset 226, and grouped and counted as such by content control wheel 410.

Figure 4C:
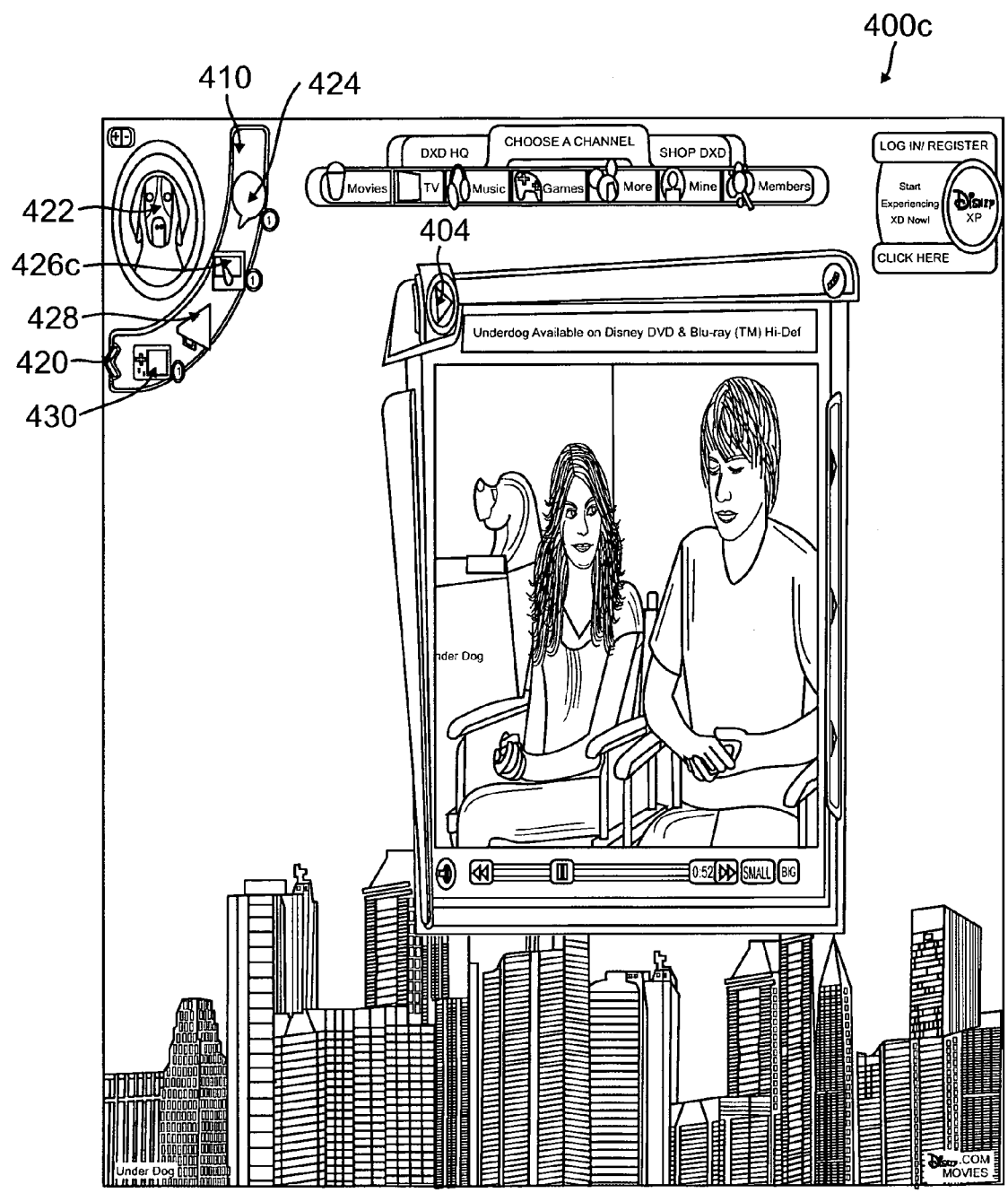
FIG. 4C shows yet another visual frame of the exemplary rich multimedia interaction of FIG. 4A, wherein content is managed according to one embodiment of the present invention.

Reassignment of content objects is further shown by FIG. 4C, which shows visual frame 400c of an exemplary rich multimedia interaction in the form of an interactive entertainment channel devoted to the movie Underdog. As was the case for visual frame 400b in FIG. 4B, visual frame 400b includes rollover 422, video player 404 playing another Underdog video clip, and content control wheel 410 including control wheel rotation activator 420, chat icon 424, user poll icon 426, message icon 428, and gadget icon 430. Comparison of FIGS. 4B and 4C shows that user poll 408 in FIG. 4B is absent in FIG. 4C, and that unlike user poll icon 426b in FIG. 4B, which indicated no user poll content objects in reserve subset 226, user poll icon 426c shows that there is one user poll, i.e. user poll 408, in reserve subset 224.

Thus, the present application discloses methods and systems for managing content within a rich multimedia interaction. As an example, by determining a display subset and a reserve subset of content objects associated with a rich multimedia interaction, and displaying the display subset while activating the reserve subset in a minimized state, the present disclosure describes a content management approach capable of conserving both display space and graphical computing resources. As another example, by providing a content control virtual tool configured to group and present a count of the reserve content objects according to one or more content object classes, the disclosed content management approach enables management of content within a wide variety of rich multimedia interactions. By further enabling a user to reassign content between the display subset and the reserve subset, the present application provides a powerful, flexible, and user friendly content management solution.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A system for managing content within a rich multimedia interaction, the system comprising:
a content server including a data storage unit comprising a non-transitory computer readable storage medium;
a content object database stored on the content server, the content object database configured to store a set of content objects associated with the rich multimedia interaction;
a content management software application stored on the data storage unit, the content management software application configured to determine, from the set of content objects associated with the multimedia interaction, a display subset and one or more reserve content objects assigned to a reserve subset; and
a content control virtual tool provided by the content management software application, the content control virtual tool configured to:
group and present a count of the one or more reserve content objects according to one or more content object classes, the content control virtual tool further configured to enable a user of the rich multimedia interaction to reassign content objects between the display subset and the reserve subset, wherein the rich multimedia interaction comprises a plurality of interactive entertainment channels each devoted to a corresponding interactive content and a corresponding display motif, wherein the content control virtual tool includes a content control wheel and a rollover;
adorn the content control wheel to the display motif corresponding to a selected one of the plurality of interactive entertainment channels;
adorn a rollover to the display motif corresponding to the selected one of the plurality of interactive entertainment channels;
display the rollover at a corner of a display; and
display the content control wheel on the display as a segment of a wheel having count of the one or more reserve content objects, wherein the content control wheel surrounds the rollover displayed at the corner of the display.

2. The method of claim 1, further comprising running an executable program by the content control virtual tool.

3. The method of claim 2, wherein the executable program is configured to enable a print operation by the user of the rich multimedia interaction.

4. The method of claim 1, wherein the content control wheel includes a control wheel rotation activator indicating additional icons corresponding to additional content object classes to be revealed by rotating the content control wheel.

5. The method of claim 1, wherein the rollover identifies a sponsor of the rich multimedia interaction.

6. The method of claim 5, wherein the rollover includes a link to information about the sponsor of the rich multimedia interaction.

7. The method of claim 1 further comprising saving a final display format of the display subset of content objects and the reserve content objects and displaying the final display format of the display subset of content objects and the reserve content objects as an initial display at a next rich multimedia interaction by the user, wherein the saving is done in response to a valid identification of the user through a registration.

8. The method of claim 1, wherein the method is implemented using an Extensible Markup Language (XML) based content management software application.

9. A system for managing content within a rich multimedia interaction, the system comprising:
a content server;
a content object database stored on the content server, the content object database configured to store a set of content objects associated with the rich multimedia interaction;
a content management software application stored on a data storage unit, the content management software application configured to detennine, from the set of content objects associated with the multimedia interaction, a display subset and one or more reserve content objects assigned to a reserve subset; and
a content control virtual tool provided by the content management software application, the content control virtual tool configured to:
group and present a count of the one or more reserve content objects according to one or more content object classes, the content control virtual tool further configured to enable a user of the rich multimedia interaction to reassign content objects between the display subset and the reserve subset, wherein the rich multimedia interaction comprises a plurality of interactive entertainment channels each devoted to a corresponding interactive content and a corresponding display motif, wherein the content control virtual tool includes a content control wheel and a rollover;
adorn the content control wheel to the display motif corresponding to a selected one of the plurality of interactive entertainment channels;
adorn a rollover to the display motif corresponding to the selected one of the plurality of interactive entertainment channels;
display the rollover at a corner of a display; and
display the content control wheel on the display as a segment of a wheel having count of the one or more reserve content objects, wherein the content control wheel surrounds the rollover displayed at the corner of the display.

10. The system of claim 9, wherein the content management software application comprises an Extensible Markup Language (XML) based application.

11. The system of claim 9, wherein the content control wheel includes a control wheel rotation activator indicating additional icons corresponding to additional content object classes to be revealed by rotating the content control wheel.

12. The system of claim 9, wherein the rollover identifies a sponsor of the rich multimedia interaction.

13. The system of claim 12, wherein the rollover includes a link to information about the sponsor of the rich multimedia interaction.

14. The system of claim 9, further comprising a client computer.

15. The system of claim 14, wherein the client computer comprises a personal computer (PC).

16. The system of claim 14, wherein the client computer comprises a mobile communication device selected from the group consisting of a mobile telephone, a digital media player, personal digital assistant (PDA), a wireless computer, and a wireless gaming console.

* * * * *